July 18, 1961  C W. MUSSER ET AL  2,992,479
METHOD OF MAKING EQUAL TEMPERATURE PRESS-FIT OF TUBULAR MEMBERS
Filed May 14, 1958
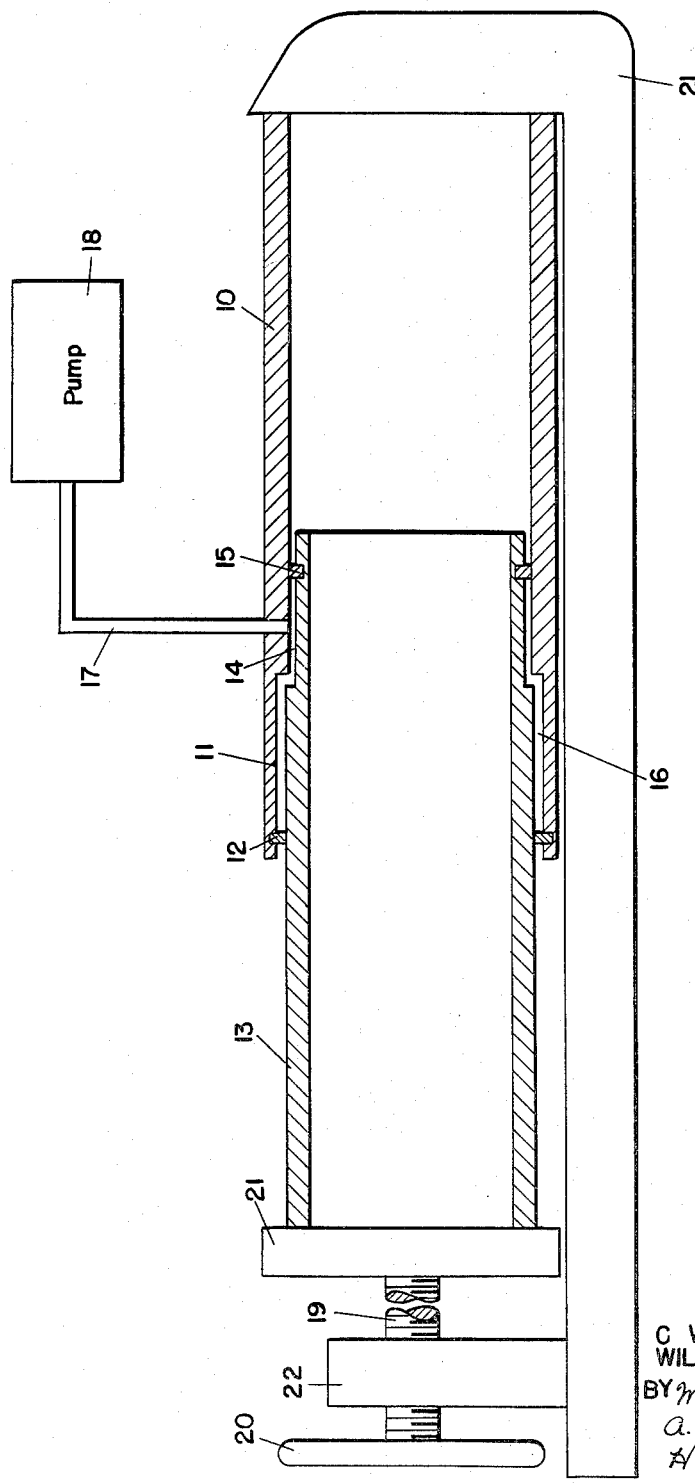
INVENTORS
C WALTON MUSSER
WILLIAM J. KROEGER
BY W. E. Thibodeau,
A. J. Dupont &
H. R. Johns

United States Patent Office 2,992,479
Patented July 18, 1961

2,992,479
METHOD OF MAKING EQUAL TEMPERATURE PRESS-FIT OF TUBULAR MEMBERS
C Walton Musser, Beverly, Mass., and William J. Kroeger, Philadelphia, Pa., assignors to the United States of America as represented by the Secretary of the Army
Filed May 14, 1958, Ser. No. 735,343
1 Claim. (Cl. 29—421)
(Granted under Title 35, U.S. Code (1952), sec. 266)

The invention described herein may be manufactured and used by or for the Government for governmental purposes without the payment of any royalty thereon.

This invention relates to the manufacture of multi-layer tubular members such as gun barrels or the like. Its outstanding characteristic is the provision of an improved method which eliminates the deleterious effects of heat in the fabrication of such members.

Heretofore, in order to shrink an outside cylinder onto a gun barrel so that it could fire at a higher pressure, the outer cylinder has been heated to expand it for assembly. In fact, shrink fits are commonly known to be a process of heating up or cooling down (whichever is applicable) one of the cylinders so as thermally to cause a change of their size. Usually the outer tube is heated so as to increase its size. This must be done within the desired physical limitations of the steel. Consequently, there is a temperature beyond which shrink fits cannot go.

Steel expands only .0065 inch for each thousand degree increase in temperature. For a high physical limitation steel, a one thousand degree difference between the temperatures of the outer and inner sleeves is impossible to obtain. Under these conditions, the two tubes cannot be put together for the reason that it is necessary to have a certain amount of clearance to mechanically fit them together particularly as the heated outside sleeve tends to heat the inside sleeve rapidly. Consequently, only some few thousandths of an inch of the .0065 inch can be utilized due to mechanical difficulties.

In accordance with the present invention, these difficulties are avoided by the provision of a method whereby a fluid pressure is utilized to maintain a clearance between the tubes during the assembly of the multi-layer tubular member.

The invention will be better understood from the following description when considered in connection with the accompanying drawing and its scope is indicated by the appended claim.

The single figure of the drawing illustrates one way of practicing the equal temperature press fit method of assembling multi-layer tubular members.

In this figure, an outer tubular member 10 has its inner diameter enlarged as indicated at 11 and is provided with a seal ring 12. An inner tubular member 13 has its outer diameter reduced as indicated at 14 and has near its end a seal ring 15. This arrangement provides between the tubes 10 and 13 a cavity 16 which is connected through a pipe 17 to a pump 18.

Assuming the outside diameter of the tube 13 to be slightly greater than the inside diameter of the outer tube 10 as illustrated, fluid is pumped into the cavity 16 under a pressure sufficient to expand the tube 10 and compress the tube 13 to a point where the tube 13 may be inserted into the tube 10. As the tube 13 travels along inside the tube 10, the seal 15 engages the inner surface of the tube 10 and the seal 12 engages the outer surface of the tube 13.

Various means may be utilized to bring the two tubes together. The drawing shows a clamp having extensions 21 and 22 between which the tubes are placed. Threaded through the extension 22 is a shaft 19 having at one end a handwheel 20 and at the other end a member 21 which engages the end of the tube 13. With the clearance provided by the fluid pressure within the cavity 16, rotation of the handwheel 20 is effective to push the tube 13 into the tube 10.

While the seals 12 and 15 have been illustrated as of the O-ring type, it is apparent that chevron or other types of packing could be used. Another suitable type of seal is an O-ring having additional plastic rings to prevent its extrusion at high pressure.

The fluid pressure required in the cavity 16 is, of course, dependent on the thickness of the tubes and the amount of pre-stress it is desired to place in them. For naval or artillery gun usage, this varies from 10 to 40,000 pounds per square inch. If the fluid used is oil any of the standard hydraulic pumps may be used.

After the two tubes have been completely put together the enlarged and decreased ends of the tubes are sawed off so that there remains an outer sleeve shrunk on an inner sleeve with any desired amount of pre-stress in the two tubes up to their yield point. This method of manufacture produces no axial stresses and permits the tubes to be put together without endangering their yield strength by heating. It also provides a tighter fit or a higher degree of utilization than would be possible with the customary shrink fit.

We claim:

In a method of making an equal temperature press fit between an outer tube and an inner tube having an outer diameter greater than the inner diameter of said outer tube, the steps which include enlarging the diameter of a section at one end of said outer tube, reducing the diameter of a section at one end of said inner tube, mounting seals each at the outer end of a different one of said sections, inserting said reduced end into said enlarged end to a point where the seal at the end of said inner tube engages the unenlarged section of said outer tube and the seal at the end of said outer tube engages the unreduced section of said inner tube, introducing between said tubes and said seals a fluid under sufficient pressure to expand said outer tube within its elastic limit and to compress said inner tube within its elastic limit, and forcing the unreduced section of said inner tube into the unenlarged section of said outer tube.

References Cited in the file of this patent

UNITED STATES PATENTS

| | | |
|---|---|---|
| 1,959,901 | Buehle | May 22, 1934 |
| 2,293,426 | Coberly | Aug. 18, 1942 |
| 2,348,293 | Hamer | May 9, 1944 |
| 2,832,653 | Wilson | Apr. 29, 1958 |
| 2,926,940 | Maass | Mar. 1, 1960 |

FOREIGN PATENTS

| | | |
|---|---|---|
| 270,375 | Germany | Aug. 26, 1913 |

OTHER REFERENCES

Machinery, vol. 84, Mar. 5, 1954, page 497 of interest.